US006325941B1

(12) United States Patent
Zappe

(10) Patent No.: US 6,325,941 B1
(45) Date of Patent: Dec. 4, 2001

(54) METHOD OF CONTROLLING THE FATTY ACID CONTENT OF COOKING FATS OR COOKING OILS

(76) Inventor: Ronald J. Zappe, P.O. Box 1533, Gramercy, LA (US) 70052-1533

( * ) Notice: Subject to any disclaimer, the term of this patent is extended or adjusted under 35 U.S.C. 154(b) by 0 days.

(21) Appl. No.: 09/518,933

(22) Filed: Mar. 3, 2000

Related U.S. Application Data

(60) Division of application No. 09/206,204, filed on Dec. 5, 1998, now abandoned, which is a continuation-in-part of application No. 09/010,272, filed on Jan. 21, 1998, now Pat. No. 5,846,409.

(51) Int. Cl.[7] .................................................... A23L 1/015
(52) U.S. Cl. .......................... 210/690; 210/743; 210/805; 210/DIG. 8; 426/417
(58) Field of Search ..................................... 210/690, 739, 210/743, 745, 746, 805, 806, 807, DIG. 8; 426/417

(56) References Cited

U.S. PATENT DOCUMENTS

| 2,324,763 | * | 7/1943 | Carruthers | 210/806 |
|---|---|---|---|---|
| 2,698,092 | | 12/1954 | Morton | 210/122.2 |
| 3,100,747 | | 8/1963 | Hall | 210/167 |
| 3,107,601 | | 10/1963 | Longmire | 99/330 |
| 3,447,685 | | 6/1969 | Bircher | 210/167 |
| 3,630,361 | | 12/1971 | Keating | 210/85 |
| 3,667,613 | | 6/1972 | Angold | 210/336 |
| 4,243,523 | * | 1/1981 | Pelmulder | 210/652 |
| 4,443,334 | * | 4/1984 | Shugarman et al. | 210/168 |
| 4,747,944 | | 5/1988 | George | 210/167 |
| 4,880,652 | * | 11/1989 | Regutti | 426/417 |
| 5,049,264 | * | 9/1991 | Rosnack et al. | 210/117 |
| 5,247,876 | | 9/1993 | Wilson et al. | 99/408 |
| 5,320,755 | * | 6/1994 | Hagvist et al. | 210/652 |
| 5,597,601 | | 1/1997 | Griffin | 426/417 |
| 5,620,897 | | 4/1997 | Zappe | 436/23 |
| 6,210,590 | * | 4/2001 | Zappe | 210/739 |

\* cited by examiner

*Primary Examiner*—Matthew O. Savage
(74) *Attorney, Agent, or Firm*—Reginald F. Roberts, Jr.

(57) ABSTRACT

An adjustable continuous filtration system; a continuous split-stream bypass filtration system; a method for controlling the proportion of a fluid recycled through a filtration system; a method for controlling the proportion of a fluid which is routed to the filter of a filtration system, and the proportion of the fluid which is discharged from the system without passing through the filter; and a method for controlling the quality of cooking fats and cooking oils. The mechanisms for controlling the proportion of fluid routed or recycled to a filter depend on the size or width of orifices in passageways conveying the fluid, including the restriction of one or more of the orifices. A needle valve beneficially provides a continuous range of variation of orifice size. If the quality of cooking fat or cooking oil discharged from the filtration system is below industry standards, the proportion of the cooking fat or cooking oil routed or recycled to the filter is increased. If the quality of the discharged cooking fat or cooking oil is appreciably above industry standards, the proportion of the cooking fat or cooking oil routed or recycled to the filter is decreased.

2 Claims, 7 Drawing Sheets

METHOD OF CONTROLLING THE FATTY ACID CONTENT OF COOKING FATS OR COOKING OILS

CROSS-REFERENCE TO RELATED APPLICATION

This application is a divisional of U.S. patent application Ser. No. 09/206,204 filed on Dec. 5, 1998, now abandoned, which was a continuation-in-part of U.S. patent application Ser. No. 09/010,272 filed on Jan. 21, 1998, now U.S. Pat. No. 5,846,409.

BACKGROUND OF THE INVENTION

The present invention relates to filtration. More particularly, the invention relates to a filtration system for quality control of cooking fats and cooking oils.

In the culinary industry filtration is generally employed to purify used cooking fats and cooking oils. In the absence of such purification, impurities build up in the fats and oils to a level which is unacceptable by industry standards.

As fats and oils are used in cooking, they tend to break down, degrade, and hydrolyze to free fatty acids, glycerol, and other polar products. The free fatty acids are among the more harmful products of this degradation. The recommended maximum acceptable level for free fatty acids is three to four percent.

The prior art discloses filtration systems for removing such impurities from cooking fats and cooking oils; see, e.g., U.S. Pat. Nos. 5,597,601, 4,747,944, 3,667,613, 5,247,876, 3,107,601, 2,698,092, and 3,630,361. What is lacking, however, is a filtration system which is adjustable in accordance with the quality of the cooking fat or cooking oil which is being filtered. The present invention provides such a system.

More specifically, the prior art fails to provide filtration apparatus in which a predetermined portion of the cooking fat or cooking oil is recycled or routed to the filtration system before being discharged therefrom. For example, U.S. Pat. No. 4,747,944 to George discloses a filtration system in which filtrate is recirculated by being discharged into a vessel which contains unfiltered cooking fat or cooking oil. The mixture of partially-filtered fat or oil is then returned to the filter. An obvious drawback of this system is the absence of any mechanism for controlling the proportion of the fat or oil which is recycled to the filter. A second apparent limitation is the requirement of a vessel for mixing the liquid discharged from the filter with unfiltered liquid.

British Patent 751,892 discloses a filtration system for mineral oil. The system includes a part-flow filter cartridge which controls the proportion of mineral oil which is recycled to a filter. It will be apparent to those skilled in the art that this control mechanism lacks flexibility with regard to varying the proportion of fluid which is routed or recycled to the filter. This limitation is particularly serious with regard to the desirability of continuous variation of the proportion of fluid which is recycled, or which is routed to the filter before being discharged from the filtration system.

SUMMARY OF THE INVENTION

In general, the present invention in a first aspect provides an adjustable continuous recycle filtration system. The filtration system comprises a filter; means for conveying a fluid to the filter; means for recycling a portion of the fluid to the filter; and means for controlling the proportion of the fluid which is recycled to the filter by controlling the size of an orifice in a passageway through which the fluid flows.

A first embodiment of the adjustable recycle filtration system comprises a filter; means for pressurizing a fluid to be conveyed to the filter; a first passageway for receiving the pressurized fluid from the pressurization means; a second passageway for receiving fluid discharged from the filter; means for lowering the pressure in the second passageway below the pressure in the first passageway; a third passageway connected to the pressure-lowering means; a fourth passageway connected to the third passageway and to the filter; a fifth passageway connected to the third and fourth passageways; a sixth passageway for discharging fluid from the fifth passageway; and an orifice restriction disposed between the fifth and sixth passageways, for controlling the rate of flow of the fluid through the fourth, fifth, and sixth passageways. The first, second, third, fourth, fifth, and sixth passageways, the pressure-lowering means, and the orifice restriction are constructed and arranged so that fluid discharged from the third passageway is split into a first stream flowing through the fourth passageway and a second stream flowing through the fifth passageway, and the proportion of fluid which is recycled to the filter before being discharged through the sixth passageway is controlled and determined by the size of an orifice in the orifice restriction between the fifth and sixth passageways.

A second embodiment of the adjustable recycle filtration system comprises a filter; a first passageway which provides an inlet passageway for a fluid to be conveyed to the filter; a second passageway which provides a passageway for fluid discharged from the filter; means for lowering the pressure in the second passageway below the pressure in the first passageway; a third passageway connected to the pressure-lowering means; a fourth passageway connected to the third passageway and to the filter; a fifth passageway interconnecting the third and fourth passageways; and an orifice restriction disposed in the third passageway, for controlling the rate of flow through the fourth and fifth passageways; the first, second, third, fourth, and fifth passageways, the pressure-lowering means, and the orifice restriction being constructed and arranged so that fluid discharged from the third passageway is split into a first stream flowing through the fourth passageway and a second stream flowing through the fifth passageway, and the proportion of the fluid which is recycled to the filter before being discharged through the fifth passageway is controlled and determined by the size of an orifice in the orifice restriction disposed in the third passageway.

A third embodiment of the adjustable recycle filtration system comprises a filter; means for pressurizing a fluid to be conveyed to the filter; a first passageway for receiving the pressurized fluid from the pressurization means; a second passageway for receiving fluid discharged from the filter; a third passageway connected to the pressure-lowering means; a fourth passageway connected to the third passageway and to the filter; and a fifth passageway connected to the third and fourth passageways, for discharging fluid from the filtration system. The first, second, third, fourth, and fifth passageways, and the pressure-lowering means are constructed and arranged so that fluid discharged from the third passageway is split into a first stream flowing through the fourth passageway and a second stream flowing through the fifth passageway, and the proportion of the fluid which is recycled to the filter before being discharged from the fifth passageway is controlled and determined by the widths of the orifices in the fourth and fifth passageways.

In a second aspect the present invention provides an adjustable continuous bypass filtration system. A first embodiment thereof comprises a filter; means for pressurizing a fluid to be conveyed to the filter; a first passageway for receiving the pressurized fluid from the pressurization means; a second passageway for receiving fluid discharged from the filter; means for lowering the pressure in the second passageway below the pressure in the first passageway; a third passageway connecting the first passageway and the filter to one another; a fourth passageway connected to the first and third passageways; a fifth passageways for discharging fluid from the fourth passageway; and an orifice restriction disposed in the third passageway, for controlling the rate of flow of the fluid through the third, fourth, and fifth passageways. The pressure-lowering means are disposed between and interconnect the second, the fourth, and fifth passageways. The second passageway connects the pressure-lowering means and the filter to one another. The first, second, third, fourth, and fifth passageways, the pressure-lowering means, and the orifice restriction are constructed and arranged so that fluid discharged from the first passageway is split into a first stream flowing through the third passageway and a second stream flowing through the fourth passageway, and the proportion of the fluid which is routed to the filter before being discharged through the fifth passageway is controlled and determined by the size of an orifice in the orifice restriction disposed in the third passageway.

A second embodiment of the adjustable bypass filtration system comprises a filter; a first passageway for conveying a fluid to the filter; a second passageway for discharging fluid from the filter; means for lowering the pressure in the second passageway below the pressure in the first passageway; a third passageway connecting the first passageway and the filter to one another; a fourth passageway connected to the first and third passageways; a fifth passageway for discharging the fluid from the fourth passageway; and an orifice restriction disposed in the fourth passageway, for controlling the rate of flow of the fluid through the third, fourth, and fifth passageways; the pressure-lowering means being disposed between the fourth and fifth passageways, the second passageway interconnecting the pressure-lowering means, the filter, and the fourth passageway; the first, second, third, fourth, and fifth passageways, the pressure-lowering means, and the orifice restriction being constructed and arranged so that fluid discharged from the first passageway is partitioned into a first stream flowing through the third passageway and a second stream flowing through the fourth passageway, and the proportion of the fluid which is routed to the filter or is discharged from the system is controlled and determined by the size of an orifice in the orifice restriction disposed in the fourth passageway.

A third embodiment of the adjustable bypass filtration system comprises a filter; a first passageway for conveying a fluid to the filter; a second passageway for discharging fluid from the filter; means for lowering the pressure in the second passageway below the pressure in the first passageway; a third passageway connecting the first passageway and the filter to one another; a fourth passageway connected to the first and third passageways; and a fifth passageway for discharging the fluid from the fourth passageway; the pressure-lowering means being disposed between the fourth and fifth passageways, the second passageway interconnecting the pressure-lowering means, the filter, and the fourth passageway; the first, second, third, fourth, and fifth passageways, and the pressure-lowering means being constructed and arranged so that fluid discharged from the first passageway is partitioned into a first stream flowing through the third passageway and a second stream flowing through the fourth passageway, and the proportion of the fluid which is routed to the filter or is discharged from the system is controlled and determined by the size of orifices in the third and fourth passageways.

In a fourth embodiment of the adjustable bypass filtration system, orifice restrictions are provided in both third and fourth passageways.

A fifth embodiment of the adjustable bypass filtration system comprises a filter; a first passageway which provides an inlet passageway for a fluid to be conveyed to the filter or to be discharged from the system; a second passageway which provides a passageway for fluid discharged from the filter; a third passageway connected to the first passageway and to the filter; a fourth passageway interconnecting the first and second passageways; an orifice restriction disposed in the fourth passageway, for controlling the size of an orifice in the fourth passageway; and a fifth passageway for discharging fluid from the fourth passageway; whereby the fluid discharged from the second passageway is split into a first stream flowing through the third passageway to the filter and a second stream flowing through the fourth passageway to be discharged through the fifth passageway, and the proportion of the fluid which is routed to the filter or which is discharged through the fifth passageway is controlled and determined by the size of an orifice in the orifice restriction disposed in the fourth passageway.

The direction of fluid flow through the filter can be reversed if reverse flow through the filter should be desired or required.

In a third aspect the invention provides a method for controlling the quality of cooking fats and cooking oils. The method comprises providing a filter for filtering the cooking fats or cooking oils; routing or recycling a portion of a cooking fat or a cooking oil to the filter; and controlling the proportion of the cooking fat or the cooking oil which is routed or recycled to the filter before being discharged. The discharged cooking fat or cooking oil is analyzed for quality control. If the quality of the discharged cooking fat or cooking oil is below industry standards, the proportion of the cooking fat or cooking oil which is recycled is increased. If the quality of the discharged cooking fat or cooking oil is appreciably above industry standards, the proportion of the cooking fat or cooking oil which is recycled is decreased.

In a fourth aspect the invention provides a method for controlling the proportion of fluid recycled through a filtration system. The method comprises providing a filter for filtering the fluid; pressurizing the fluid for conveyance to the filter; conveying the pressurized fluid to the filter; recycling a portion of the fluid to the filter; and controlling the proportion of the fluid which is recycled to the filter before being discharged from the system by controlling the size of an orifice in a passageway through which the fluid flows.

In a fifth aspect the invention provides a method for controlling the proportion of a fluid which is routed to the filter of a filtration system, and the proportion of said fluid which is discharged from the system without passing through the filter. The method comprises providing a filter for filtering the fluid; conveying a portion of the fluid to the filter through a first passageway; discharging the filtered fluid and a portion of the unfiltered fluid through a second passageway; and controlling the proportions of the fluid flowing through the first and second passageways by disposing an orifice restriction in the first or in the second passageway.

BRIEF DESCRIPTION OF THE DRAWINGS

FIG. 1-A is a schematic representation of a second embodiment of an adjustable continuous recycle filtration system, made in accordance with the principles of the present invention.

FIG. 2-A is a schematic representation of a second embodiment of an adjustable continuous bypass filtration system, made in accordance with the principles of the present invention.

FIG. 2-B is a schematic representation of a third embodiment of an adjustable continuous bypass filtration system, made in accordance with the principles of the present invention.

DETAILED DESCRIPTION OF THE INVENTION

Figure 1:
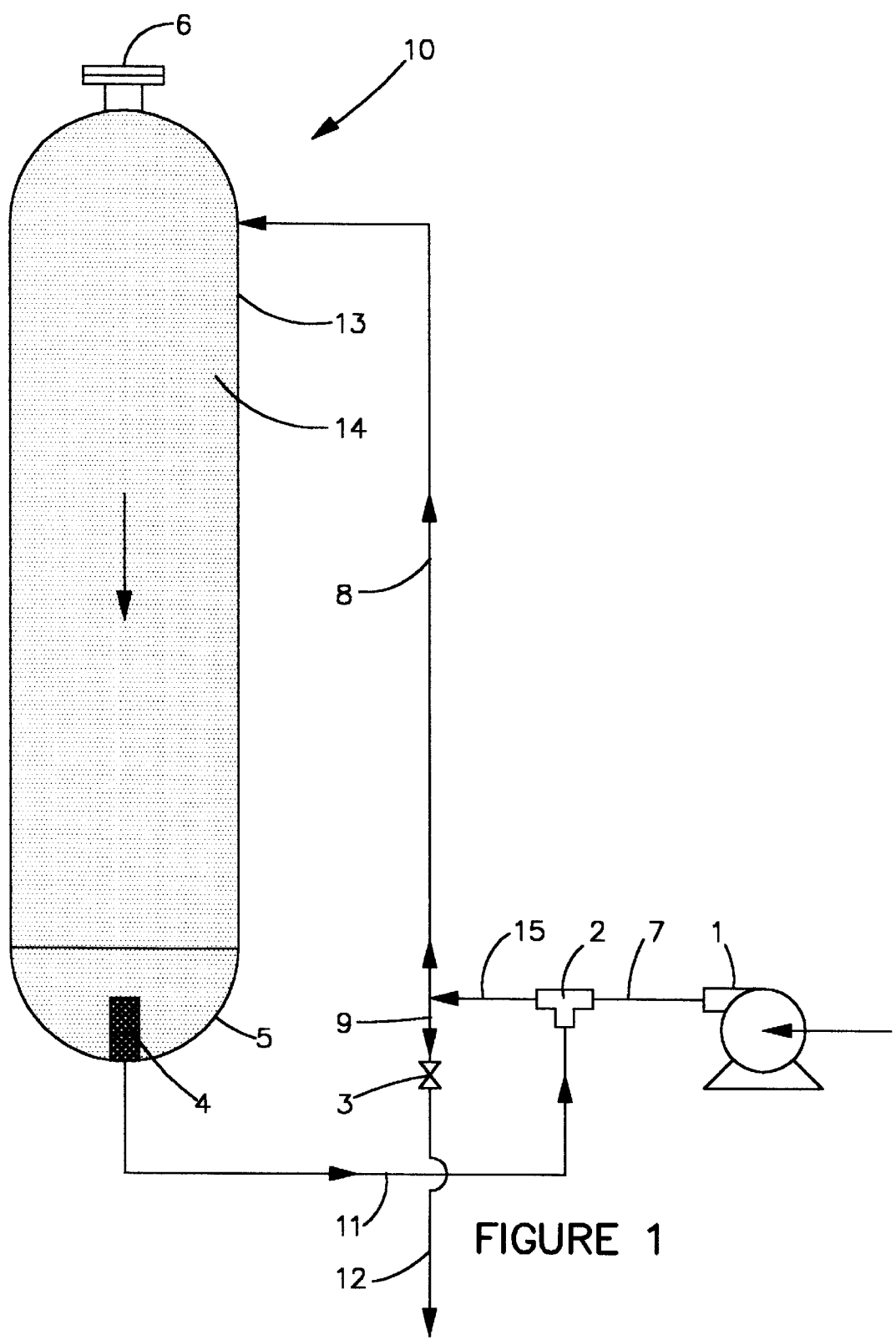
FIG. 1 is a schematic representation of a first embodiment of an adjustable continuous recycle filtration system, made in accordance with the principles of the present invention.
Figure 1A:
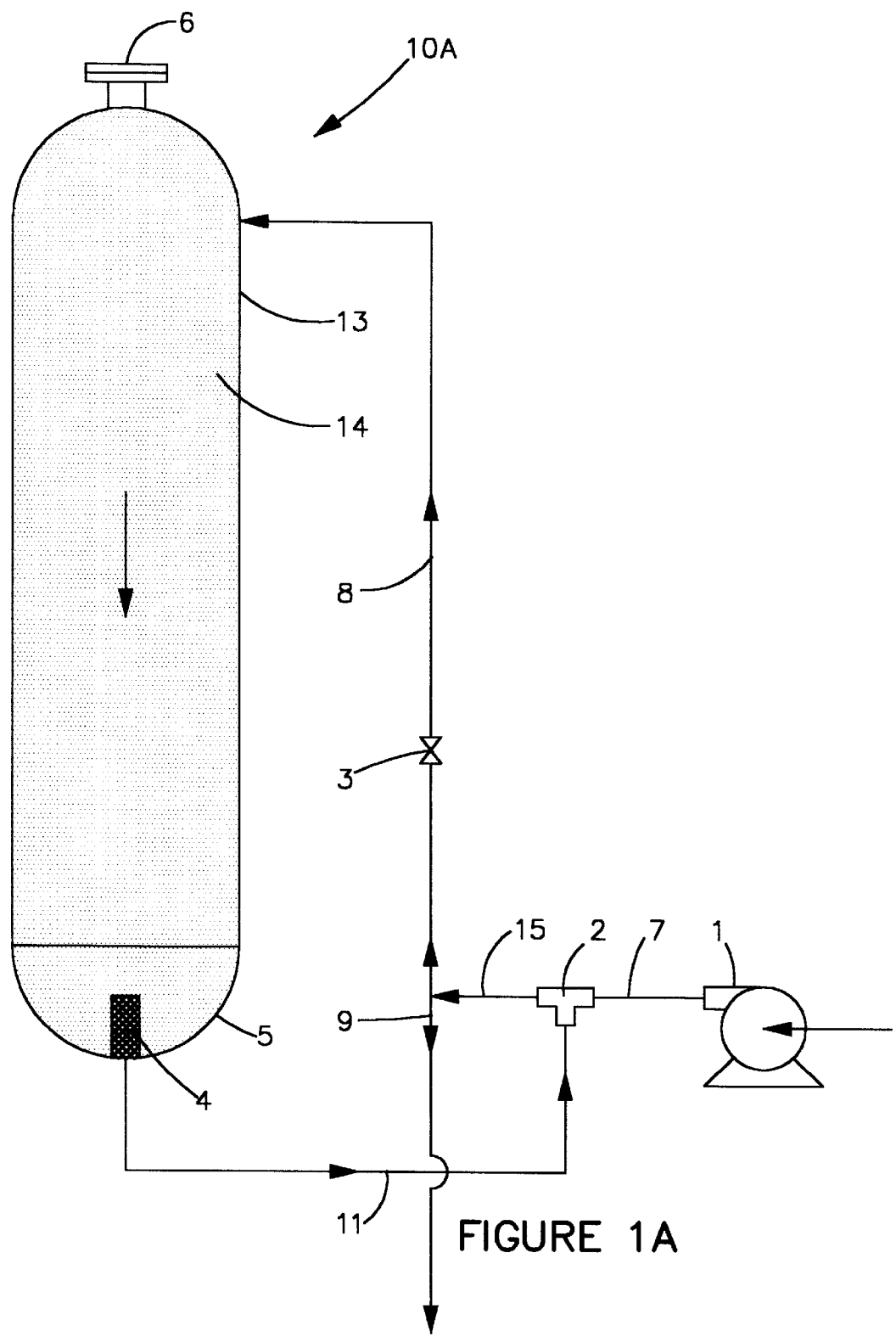

More specifically, reference is made to FIG. 1, in which is shown a first embodiment of an adjustable continuous recycle filtration system, made in accordance with the principles of the present invention, and generally designated by the numeral 10.

A pump 1 discharges a fluid into line 7. An ejector 2 creates a partial vacuum in line 11, and/or lowers the pressure in line 11 below that in line 7. Fluid discharged from the ejector 2 is split into first and second streams which flow through lines 8 and 9, respectively. Fluid in line 8 enters a container 13 filled with a filter medium 14, percolates or diffuses therethrough, and after passing through a particle-retaining screen 4 exits through line 11 and is recycled to the ejector 2. An orifice restriction 3 between lines 9 and 12 controls the rate of fluid flow through lines 8, 9, and 12 by imposing a pressure drop across the orifice restriction 3. By varying the size of the orifice, the rates of flow through lines 8, 9, and 12 can be varied as much as desired. Thus, when the pressure drops across the container 13 and the orifice restriction 3 are equal, the rate of flow through line 8 is the same as through lines 9 and 12. By increasing the restriction, i.e. by decreasing the size of the orifice between lines 9 and 12, a slower rate of flow is obtained through lines 9 and 12 than through line 8. The opposite effect is achieved by decreasing the restriction, i.e by increasing the size of the orifice between lines 9 and 12, so that more of the partially-filtered fluid is discharged through line 12 than is recycled to the container 13 through line 8. Preferably, the orifice restriction 3 is constructed and arranged to enable continuous variation of the degree of restriction without interrupting the flow to change or adjust the orifice-restriction device. One means of so doing is to use a valve, preferably a needle valve, as the orifice restriction 3.

Reference is now made to FIG. 1-A, in which is shown a second embodiment of an adjustable continuous recycle filtration system, made in accordance with the principles of the present invention, generally designated by the numeral 10A. In this embodiment the orifice restriction 3 is disposed in line 8 rather than in line 9. The function of the orifice restriction 3 remains the same; viz., to control the rates of flow through lines 8 and 9, thereby controlling the proportion of fluid recycled to the filter 13.

Figures 2, 3:
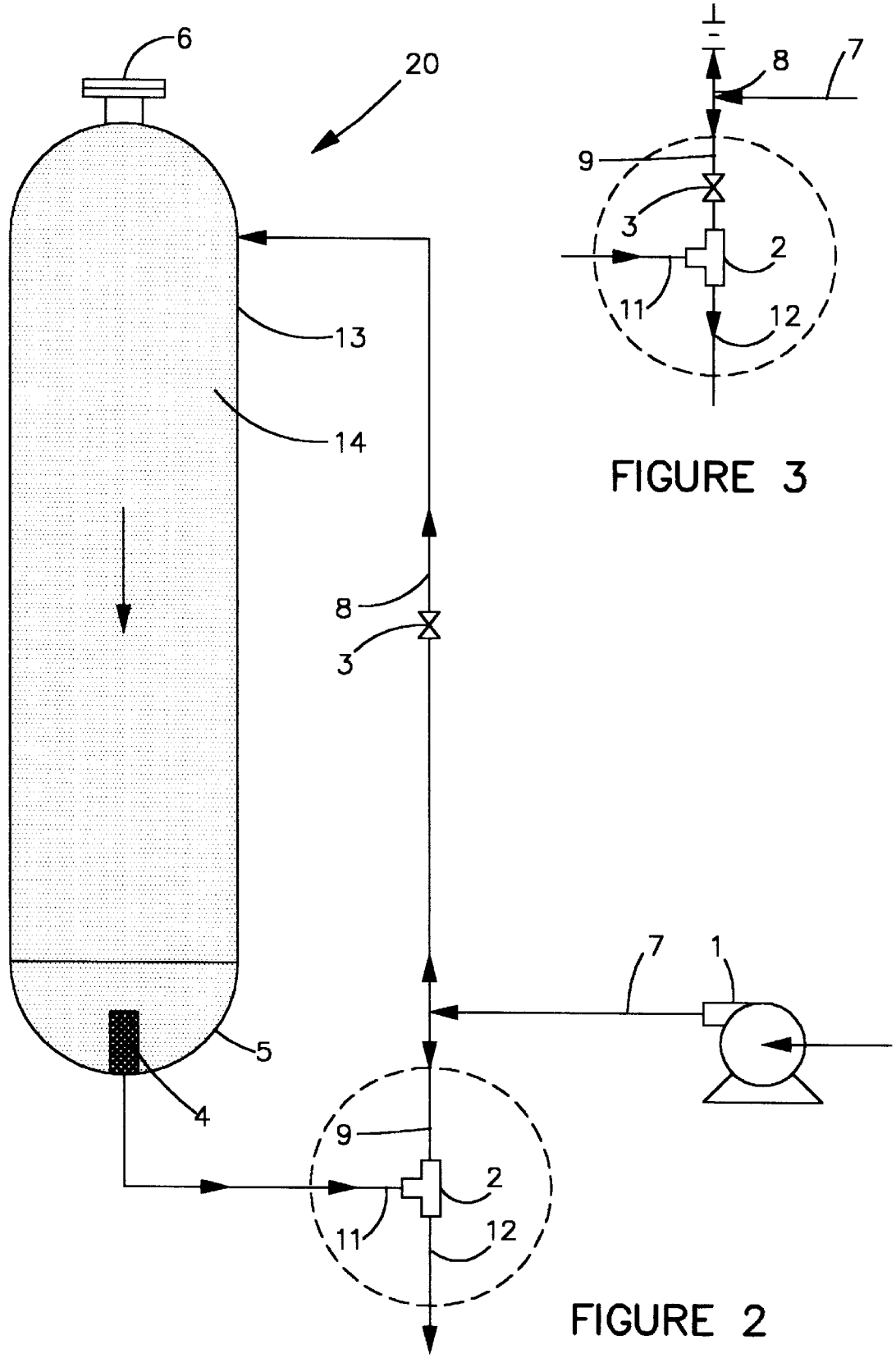
FIG. 2 is a schematic representation of a first embodiment of an adjustable continuous bypass filtration system, made in accordance with the principles of the present invention.
FIG. 3 is a schematic representation of a portion of a fourth embodiment of an adjustable continuous bypass filtration system, made in accordance with the principles of the present invention.
Figure 2A:
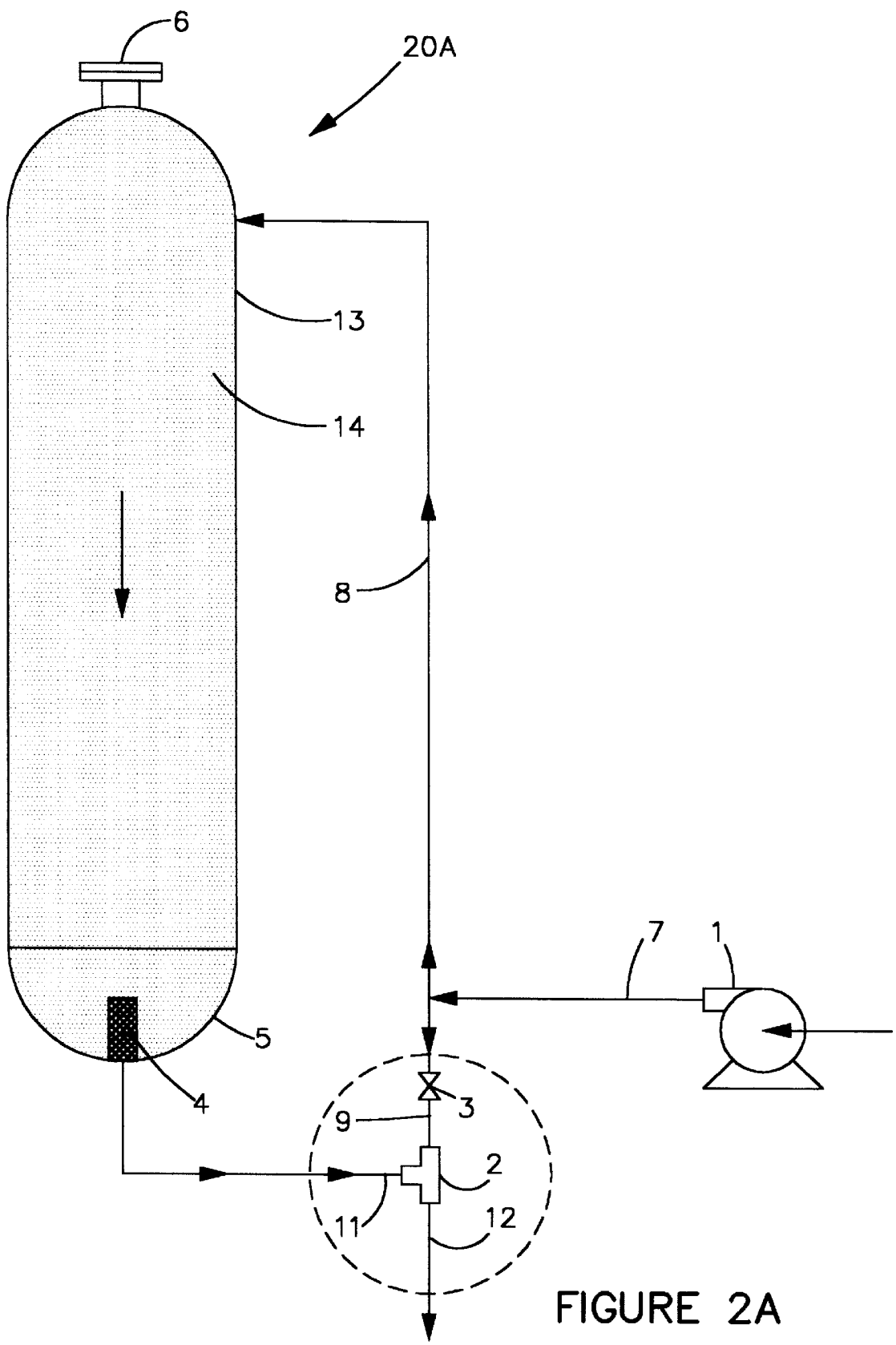
Figure 2B:
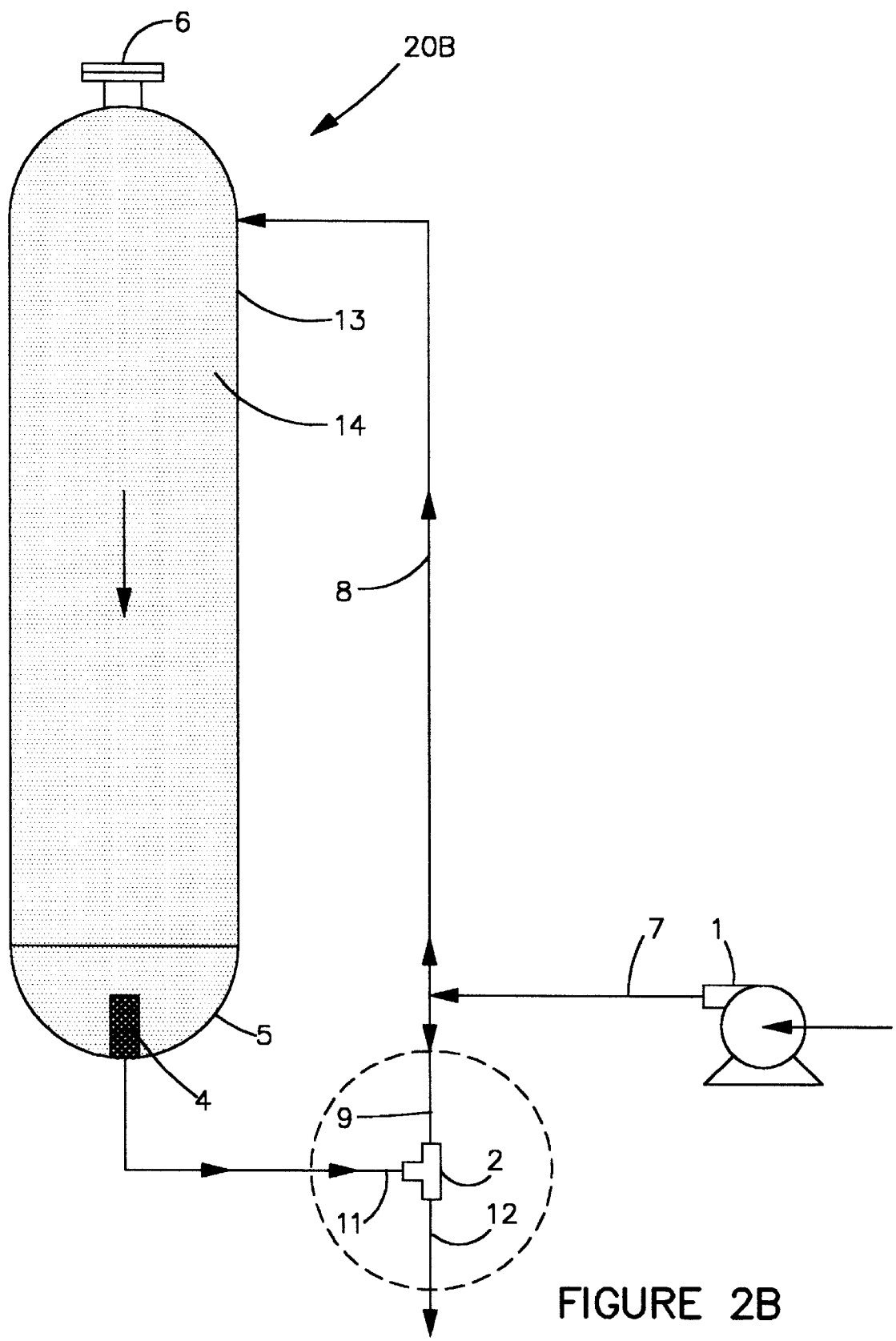

Reference is now made to FIG. 2, in which is shown a first embodiment of an adjustable continuous bypass filtration system, made in accordance with the principles of the present invention, and generally designated by the numeral 20.

The adjustable continuous bypass filtration system 20 comprises a filter 13; a pump 1; a first passageway 7 connected to the pump 1; a second passageway 11 for receiving fluid discharged from the filter 13; an ejector 2 for lowering the pressure in the second passageway 11 below the pressure in the first passageway 7; a third passageway 8 connecting the first passageway 7 and the filter 13 to one another; a fourth passageway 9 connected to the first 7 and third 8 passageways; a fifth passageway 12 for discharging fluid from the fourth passageway 9; and an orifice restriction 3 disposed in the third passageway 8, for controlling the rate of flow of the fluid through the third 8, fourth 9, and fifth 12 passageways. The ejector 2 is disposed between and interconnects the second 11, fourth 9, and fifth 12 passageways. The fluid discharged from the first passageway 7 is split into a first stream flowing through the third passageway 8, and a second stream flowing through the fourth passageway 9. The proportion of the fluid which is routed to the filter 13 via the third passageway 8 before being discharged through the fifth passageway 12 is controlled and determined by the size of an orifice in the orifice restriction 3 disposed in the third passageway 8. The proportion of the fluid flowing through the third passageway 8 to the filter 14 is increased by opening orifice 3 if the free fatty-acid content of the fluid discharged through the fifth passageway 12 is above industry standards; and the proportion of the fluid flowing through the third passageway 8 to the filter 14 is decreased by closing the orifice 3 if the free fatty-acid content of the fluid discharged through the fifth passageway 12 is below industry standards.

Reference is now made to FIG. 2-A, in which is shown a second embodiment of an adjustable continuous bypass filtration system, made in accordance with the principles of the present invention, and generally designated by the numeral 20A. In this embodiment the orifice restriction 3 is disposed in the fourth passageway 9 instead of in the third passageway 8. The function of the orifice restriction 3 is the same for both embodiments 20 and 20A; viz., to control the proportions of fluid routed to the filter 13 via the third passageway 8 and to the fourth passageway 9, from which it is discharged through the fifth passageway 12.

Reference is now made to FIG. 2-B, in which is shown a third embodiment of an adjustable continuous bypass filtration system, made in accordance with the principles of the present invention, and generally designated by the numeral 20B. In this embodiment there are no orifice restrictions 3, and the proportion of fluid which is conveyed to the filter 13 through the third passageway 8 and to the fourth passageway 9 is determined by the size of orifices in the third passageway 8 and fourth passageway 9.

Reference is now made to FIG. 3, in which is shown a portion of a fourth embodiment of an adjustable continuous bypass filtration system, made in accordance with the principles of the present invention. In this fourth embodiment, orifice restrictions 3 are provided in lines 8 and 9, and the ejector 2 interconnects lines 9, 11, and 12.

Figure 4:
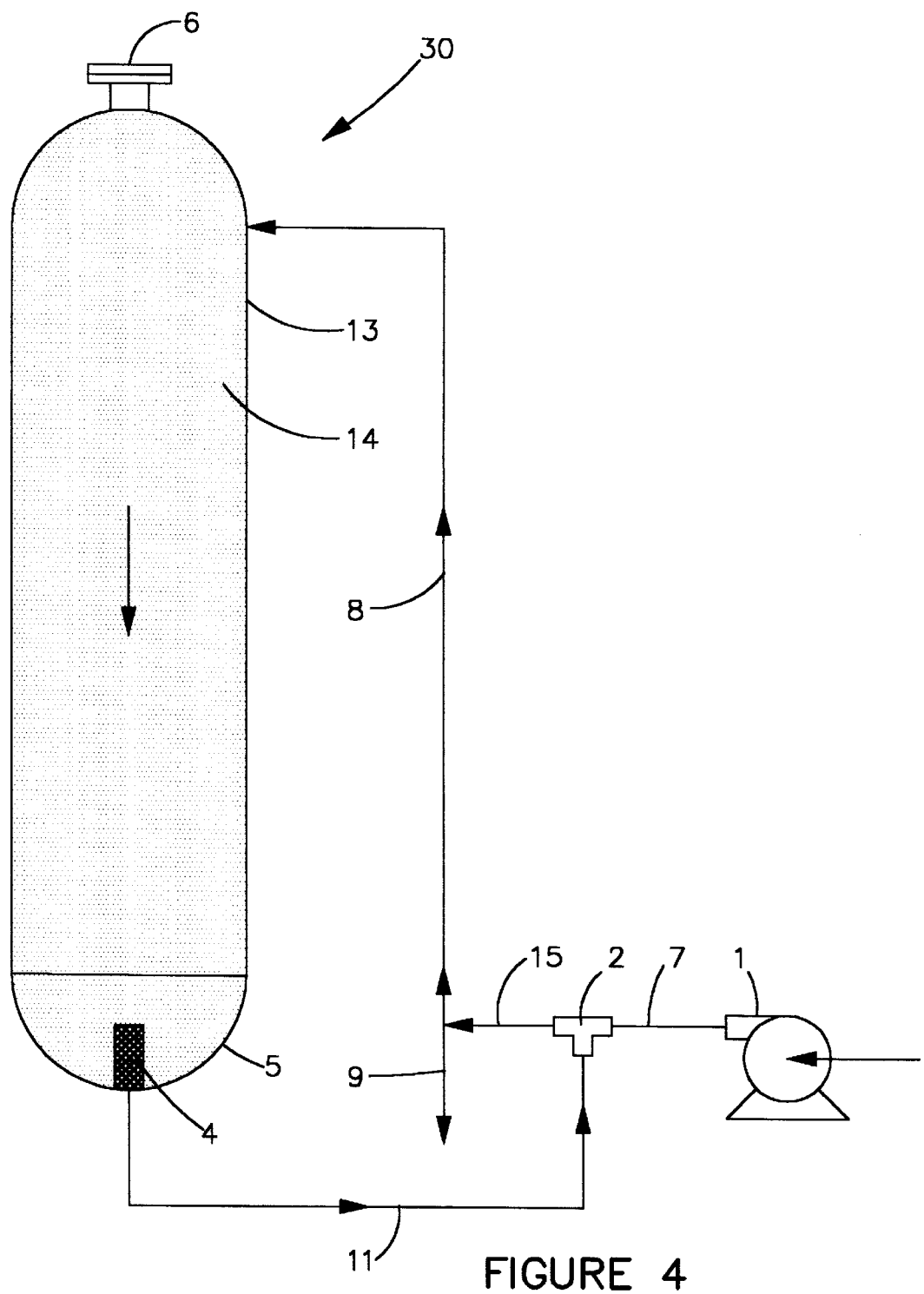
FIG. 4 is a schematic representation of a second embodiment of an adjustable continuous recycle filtration system, made in accordance with the principles of the present invention.

Reference is now made to FIG. 4, in which is shown a second embodiment of an adjustable recycle filtration system, made in accordance with the principles of the present invention, and generally designated by the numeral 30. The second embodiment 30 of the filtration system is similar to the first embodiment 10 shown in FIG. 1, except that in the second embodiment 30 the orifice restriction 3 and line 12 are omitted from the system. In the second embodiment 30, the proportion of fluid recycled to the filter 13 is controlled and determined by the sizes of orifices in lines 8 and 9.

Figure 5:
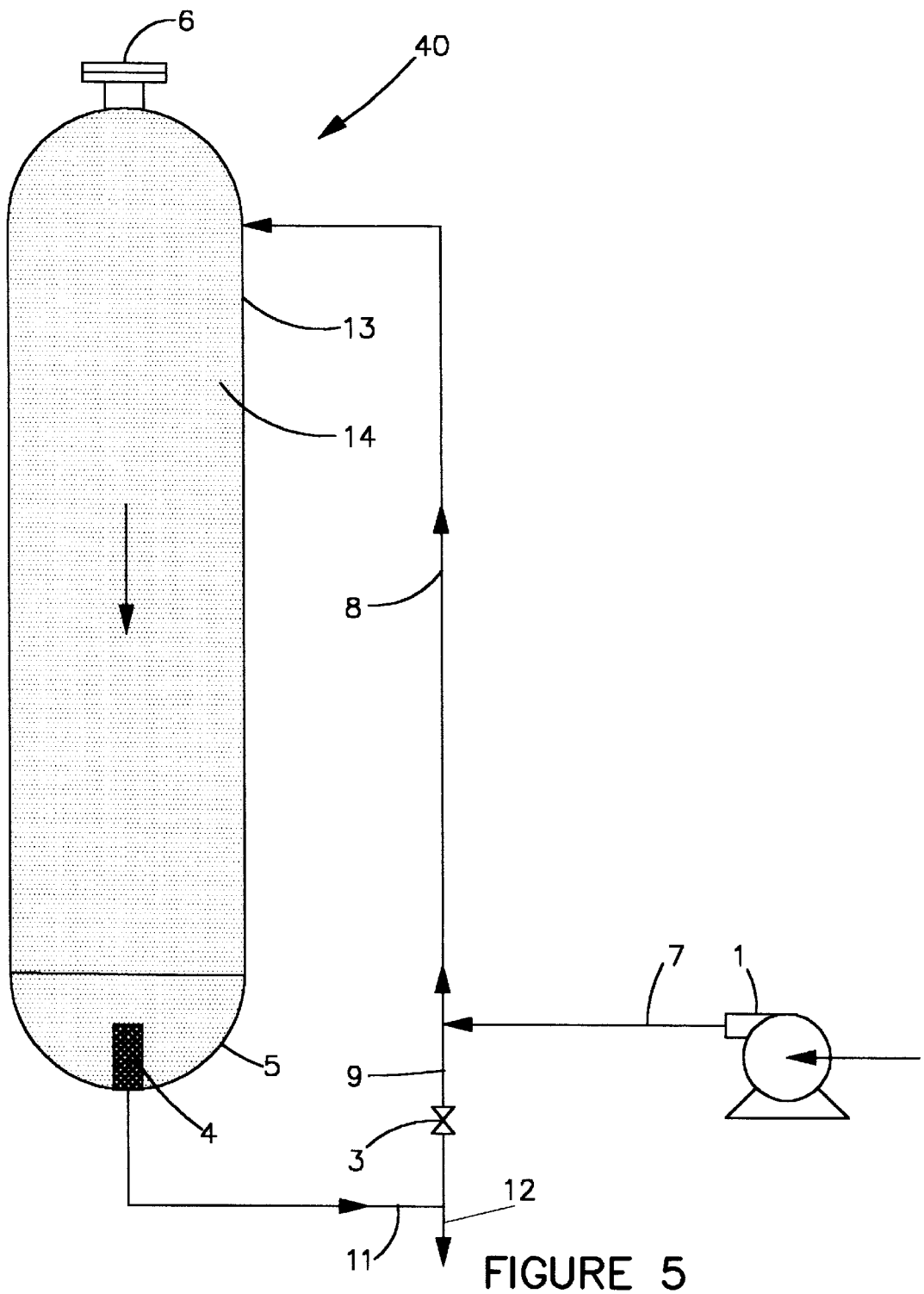
FIG. 5 is a schematic representation of a fourth embodiment of an adjustable continuous bypass filtration system, made in accordance with the principles of the present invention.

Reference is now made to FIG. 5, in which is shown a fifth embodiment of an adjustable continuous bypass filtration system, made in accordance with the principles of the present invention, and generally designated by the numeral 40. This embodiment differs from the second embodiment 20A thereof shown in FIG. 2-A by omission and absence of the ejector 2.

In preferred embodiments of the present invention, the adjustable continuous filtration systems are used to filter and/or purify used cooking fats and cooking oils. For this purpose the cooking fat or cooking oil being discharged from the filtration system is tested for quality control, to determine whether it satisfies the specifications of the industry. If the discharged cooking fat or cooking oil is not within the specifications, the proportion of the cooking fat or cooking oil being routed or recycled through line 8 is increased. If the fat or oil tests far better than is required by the specifications, the rate of flow through line 8 is decreased. If purification other than filtration is needed, an adsorbent is added to or substituted for the filter medium 14. Since fats are by definition solid at room temperature, heat and/or thermal insulation are/is supplied or provided to maintain the fats in a liquid state while circulating in and through the filtration system.

It is to be understood that, if desired, a filter press or filter leaf could be used instead of a container filled with a filter medium. Such substitution would in no way affect the basic concept of the present invention. Moreover, instead of an ejector, any other means of lowering the pressure in line 11 would suffice, and would lie within the scope of the present invention. The use of an ejector is, however, clearly advantageous and is to be preferred, because it provides a compact means for so doing which is simpler, requires less space, and comprises no moving parts as compared, e.g., to a vacuum pump or a vacuum line.

Many restaurants continue to use their cooking fats and cooking oils well beyond the recommended maximum 3–4% fatty-acid content. This is primarily because, until recently, there has been no accurate, simple, and rapid method for determining the percentage of free fatty acids therein. There is now, however, an analytical method which is simple, quick, and accurate. This method is preferred for determining the free fatty-acid content of cooking fats and cooking oils in combination with the filtration/purification systems and methods herein described. The method is described in detail in U.S. Pat. No. 5,620,897 to Zappe, which is hereby incorporated by reference.

The term "fluid" includes liquids, vapors, and gases. While the preferred embodiments of the present invention utilize liquid cooking fats and cooking oils as the filtrand, the apparati and methods are by no means limited or restricted in scope to the filtration and/or purification of liquids, and include the filtration and purification of vapors and gases to remove, e.g., particulate solids therefrom.

Moreover, it will be apparent to those skilled in the art that the method of analyzing cooking fats and cooking oils, and adjusting the proportion thereof routed or recycled to the filter 13 is applicable to fluids in general, and the extension of this method to fluids generally is within the scope of the present invention.

I claim:

1. A method for controlling quality of a fluid which is to be purified, the method comprising the steps of:
    (a) providing a filter for filtering the fluid;
    (b) conveying a first portion of unfiltered fluid to the filter through a first passageway;
    (c) discharging filtered fluid from the filter and a second portion of unfiltered fluid through a second passageway;
    (d) controlling proportions of the fluid flowing through the first and second passageways;
    (e) analyzing the fluid discharged through the second passageway by determining acid content of the fluid;
    (f) increasing the proportion of fluid flowing through the first passageway which is conveyed to the filter if the acid content of the fluid discharged through the second passageway is above industry standards; and
    (g) decreasing the proportion of the fluid flowing through the first passageway which is conveyed to the filter through the first passageway if the acid content of the discharged fluid is appreciably below industry standards.

2. A method for controlling quality of a fluid which is to be purified, the method comprising the steps of:
    (a) providing a filter for filtering the fluid;
    (b) conveying a first portion of unfiltered fluid to be filtered to the filter through a first passageway;
    (c) discharging filtered fluid from the filter and a second portion of unfiltered fluid through a second passageway;
    (d) controlling proportions of the fluid flowing through the first and second passageways;
    (e) analyzing the fluid discharged through the second passageway by determining free fatty-acid content of the fluid;
    (f) increasing the proportion of fluid flowing through the first passageway which is conveyed to the filter if the free fatty-acid content of the fluid discharged through the second passageway is above industry standards; and
    (g) decreasing the proportion of the fluid flowing through the first passageway which is conveyed to the filter through the first passageway if the free fatty-acid content of the discharged fluid is appreciably below industry standards.

* * * * *